(12) United States Patent
Kuperman et al.

(10) Patent No.: US 12,030,666 B2
(45) Date of Patent: Jul. 9, 2024

(54) DRONE LAUNCHING MECHANISM

(71) Applicant: SPEAR U.A.V LTD, Tel Aviv (IL)

(72) Inventors: Gedalia Kuperman, Tel Aviv (IL); Shaked Shek, Tel Aviv (IL)

(73) Assignee: SPEAR U.A.V LTD, Tel Aviv (IL)

( * ) Notice: Subject to any disclaimer, the term of this patent is extended or adjusted under 35 U.S.C. 154(b) by 11 days.

(21) Appl. No.: 17/735,171

(22) Filed: May 3, 2022

(65) Prior Publication Data

US 2022/0348355 A1    Nov. 3, 2022

(30) Foreign Application Priority Data

May 3, 2021 (IL) ........................................ 282882

(51) Int. Cl.
*B64F 1/04* (2024.01)
*B64C 39/02* (2023.01)
(Continued)

(52) U.S. Cl.
CPC .............. *B64F 1/04* (2013.01); *B64C 39/024* (2013.01); *B64U 70/00* (2023.01); *B64U 80/70* (2023.01)

(58) Field of Classification Search
CPC ............ B64F 1/04; B64U 70/00; B64U 80/70
See application file for complete search history.

(56) References Cited

U.S. PATENT DOCUMENTS 3,968,947 A    7/1976 Schlegel et al.
9,470,477 B2    10/2016 Su
(Continued)

FOREIGN PATENT DOCUMENTS

GB         2205798 A    12/1988
WO    2017037699 A1     3/2017
(Continued)

*Primary Examiner* — Richard G Davis
(74) *Attorney, Agent, or Firm* — CANTOR COLBURN LLP (57) ABSTRACT

The present disclosure provides a launching mechanism for a drone that is housed within a container. The launching mechanism is also housed within the container and is disposed at the bottom portion of the container such that the effect of its activation causes the drone to move along a container axis defined by the longitudinal axis of the container, at a direction towards a top cover of the container and eject therethrough during the launching process. The launching mechanism includes two elements, each has a receptacle portion, wherein the receptacle portion of one of the elements is received within the receptacle portion of the second element. The two receptacle portions, when one is received within the other, confine an inner space. One of the elements is a static element that is fixed to the container, and the other element is a dynamic element that upon application of force along the container axis in the direction of the top cover is free to move in the force direction and to push the drone that is disposed between it and the top cover of the container. A pressure generator of the launching mechanism is configured for controllably causing an abrupt increase of pressure in the inner space, thus generating a propelling force along the container axis in the direction of the top cover that pushes the drone and causing its launching out of the container. The dynamic element is detachably attached to the static element such that when the propelling force exceeds a certain value, the two elements detach one from the other and the dynamic element continues to move along the container axis.

15 Claims, 11 Drawing Sheets

(51) Int. Cl.
*B64U 70/00* (2023.01)
*B64U 80/70* (2023.01)

(56) References Cited

U.S. PATENT DOCUMENTS

| | | | |
|---|---|---|---|
| 9,527,596 | B1 | 12/2016 | Adams |
| 9,632,501 | B1 | 4/2017 | Yang et al. |
| 10,442,554 | B2* | 10/2019 | Andryukov ............... B64F 1/04 |
| 2003/0089820 | A1 | 5/2003 | Martorana et al. |
| 2008/0093501 | A1 | 4/2008 | Miller et al. |
| 2010/0123041 | A1 | 5/2010 | Nair et al. |
| 2010/0252676 | A1* | 10/2010 | Koessler ............... F41F 3/0413 |
| | | | 89/14.05 |
| 2011/0315817 | A1* | 12/2011 | Miralles ................ B64C 39/024 |
| | | | 244/63 |
| 2012/0068010 | A1 | 3/2012 | Bossert et al. |
| 2012/0205488 | A1 | 8/2012 | Powell et al. |
| 2014/0117147 | A1 | 5/2014 | Hanna et al. |
| 2015/0266578 | A1 | 9/2015 | Elkins et al. |
| 2015/0267996 | A1 | 9/2015 | Su et al. |
| 2016/0137212 | A1 | 5/2016 | James et al. |
| 2016/0137312 | A1* | 5/2016 | Osterhout .......... G02B 27/0172 |
| | | | 244/17.23 |
| 2016/0293015 | A1 | 10/2016 | Bragin |
| 2016/0347476 | A1 | 12/2016 | Andryukov |
| 2017/0057635 | A1 | 3/2017 | Strayer |
| 2017/0144078 | A1 | 5/2017 | Yamada et al. |
| 2017/0144776 | A1 | 5/2017 | Fisher et al. |
| 2017/0146137 | A1 | 5/2017 | Koelzer |
| 2017/0269609 | A1 | 9/2017 | Bradlow et al. |
| 2018/0364695 | A1 | 12/2018 | Ponnarasseri et al. |
| 2019/0077503 | A1* | 3/2019 | Reddy .................... B64U 10/13 |

FOREIGN PATENT DOCUMENTS

| | | |
|---|---|---|
| WO | 2018106235 A1 | 6/2018 |
| WO | 2018229747 A1 | 12/2018 |
| WO | 2020144689 A1 | 7/2020 |
| WO | 2020144690 A1 | 7/2020 |
| WO | 2020144691 A1 | 7/2020 |

* cited by examiner

DRONE LAUNCHING MECHANISM

TECHNOLOGICAL FIELD

The present disclosure is in the field of drone launching, in particular in the field of launching mechanism.

BACKGROUND ART

References considered to be relevant as background to the presently disclosed subject matter are listed below:
WO 2018/229747
WO 2020/144691
WO 2020/144689
WO 2020/144690
U.S. Ser. No. 10/442,554
U.S. Pat. No. 9,470,477

Acknowledgement of the above references herein is not to be inferred as meaning that these are in any way relevant to the patentability of the presently disclosed subject matter.
General Description The present disclosure provides a launching mechanism for a drone that is housed within a container, e.g. a capsule. The launching mechanism is also housed within the container and is disposed at the bottom portion of the container such that the effect of its activation causes the drone to move along a container axis defined by the longitudinal axis of the container, at a direction towards a top cover of the container and eject therethrough during the launching process.

The launching mechanism includes two elements, each has a receptacle portion, e.g. having a general shape of cup, wherein the receptacle portion of one of the elements is received within the receptacle portion of the second element. The two receptacle portions, when one is received within the other, confine an inner space. One of the elements is a static element that is fixed to the container, e.g. to a bottom portion of the container, and the other element is a dynamic element that upon application of force along the container axis in the direction of the top cover is free to move in the force direction and to push the drone that is disposed between it and the top cover of the container.

A pressure generator of the launching mechanism is configured for controllably causing an abrupt increase of pressure in the inner space, thus generating a propelling force along the container axis in the direction of the top cover that pushes the drone and causing its launching out of the container. The dynamic element is detachably attached to the static element such that when the propelling force exceeds a certain value, the two elements detach one from the other and the dynamic element continues to move along the container axis.

The pressure generator may be attached to either the static or the dynamic elements such that the pressure it is generated affects the pressure of the inner propelling space.

Thus, an aspect of the present disclosure provides a drone-launching mechanism for launching a drone, contained in an elongated launching container defining a container axis extending between a container bottom and a container top through which the drone is launched. The drone-launching mechanism includes two launching elements, each having a cup portion defining a cup axis coaxial with the container axis. The cup portion may have any shape of a receptacle, e.g. tubular, cubical, etc. One of the cup portions fits into the other and the two portions jointly defining a propelling space confined therebetween. One of the two elements is a static element, typically fitted at a bottom end of the container and the other of the two elements is a dynamic element, axially displaceable towards said top such that when it so displaces it causes corresponding displacement of the drone.

A pressure generator is configured for generating an abrupt high pressure within the propelling space, upon said generation of an abrupt high pressure, said dynamic element axially displaces towards said top, thereby displacing the drone and leading to its launch.

The following are additional two alternative definitions of the drone-launching mechanism:

The first alternative definition provides a drone-launching mechanism that includes a static element base, a dynamic element base, inner walls, outer walls and a pressure generator. The inner walls, the static element base and the dynamic element base confine an inner propelling volume/space. The dynamic element base is integral with either the inner walls or the outer walls and the static base is integral with the other walls. The dynamic element base is displaced upon increase of pressure in the inner volume, said displacement causing a corresponding movement of the drone and its launch. The pressure generator is fixed to either the static element base or the dynamic element base and is configured for, upon activation thereof, increasing the pressure in said inner volume such that it causes said displacement, thereby pushing the drone out of the container and causing the launch of the drone.

The second alternative definition provides a drone-launching mechanism that includes a static element that comprises a static element base, static element walls upwardly extending from said static element base, and a static element opening defined by the end of said static element walls.

The drone-launching mechanism further includes a dynamic element that comprises a dynamic element base, a dynamic element walls upwardly projecting from said dynamic element base, and a dynamic element opening defined by the end of said dynamic element walls.

Wherein either (i) the dynamic element walls fit or are received within the static element opening defining inner walls and the static element walls defining outer walls or (ii) the static element walls fit or are received within the dynamic element opening defining the inner walls and the dynamic element walls defining outer walls, to thereby confine an inner propelling space/volume defined the inner walls, the static base element, the dynamic base element and optionally the outer walls.

A pressure generator is fixed to either the static element base or the dynamic element base and is configured for, upon activation thereof, for increasing rapidly the pressure in said inner volume such that it causes said displacement, thereby pushing the drone out of the container, and causing the launch of the drone.

In particular, the dynamic element base is displaced upon increase of pressure in the inner volume, and said displacement causing a corresponding movement of the drone and its launch. Thus, upon increase of pressure in the inner propelling space, the dynamic element separates from the static element and pushes the drone.

The following embodiments can be applied to any one of the above three alternative definitions of the drone-launching mechanism.

It is to be noted that any combination of the described embodiments with respect to any aspect of this present disclosure is applicable. In other words, any aspect of the present disclosure can be defined by any combination of the described embodiments.

In some embodiments of the drone-launching mechanism, the cup portions are cylindrical and concentric.

In some embodiments of the drone-launching mechanism, the static element is fixed to the container.

In some embodiments of the drone-launching mechanism, the dynamic element is attached to the static element in a releasable manner such that upon exceeding a certain pressure the two are detached.

In some embodiments of the drone-launching mechanism, the cup portions of the static and dynamic elements have respective static base with cup-defining walls upwardly extending therefrom and a dynamic base with cup-defining walls downwardly extending therefrom.

In some embodiments of the drone-launching mechanism, the dynamic base is attached to the top end of the cup-defining walls of the static element.

In some embodiments of the drone-launching mechanism, the dynamic element base is formed with pressure-releasing through holes to allow controlled pressure generation.

In some embodiments of the drone-launching mechanism, the upper end of the cup-defining walls of the static element rest on the dynamic base.

In some embodiments of the drone-launching mechanism, the bottom end of the cup-defining walls of the dynamic element rest on the static base.

In some embodiments of the drone-launching mechanism, the static element cup portion fits within the dynamic element cup portion.

In some embodiments of the drone-launching mechanism, the dynamic element cup portion fits within the static element cup portion.

In some embodiments of the drone-launching mechanism, the static and the dynamic elements are attached to one another by glue or by welding. It is to be noted that it is only optional and the two elements may only fit one into the other without any physical attachment and retain in position by the pressure applied thereon by other external elements that sit one of the elements.

In some embodiments of the drone-launching mechanism, the pressure generator is housed within the propelling space.

In some embodiments of the drone-launching mechanism, the pressure generator is fixed to the dynamic element.

In some embodiments of the drone-launching mechanism, the pressure generator is fixed to the static element.

In some embodiments of the drone-launching mechanism, the pressure generator is an integral part of either the static or the dynamic element.

In some embodiments of the drone-launching mechanism, the pressure generator is a chemical reaction-based pressure generator. In some embodiments, the pressure generator is a gas inflator that is configured to generate pressure based on a chemical reaction between solids and/or liquids.

In some embodiments of the drone-launching mechanism, the pressure generator comprises high-pressurized gas. In some embodiments, the pressure generator comprises a fluid communication to high-pressurized gas source.

In some embodiments of the drone-launching mechanism, the pressure generator comprises a detonator that upon detonation thereof causes said abrupt high pressure within the propelling space.

In some embodiments of the drone-launching mechanism, the detonator comprises two or more chemical reactants that upon reacting with one another causing said detonation.

In some embodiments, the drone-launching mechanism further includes a limiting thread or wire attaching the dynamic element to the static element or to a portion of the capsule for limiting the movement of the dynamic element to a certain extent after the activation of the launching mechanism. The length of the thread is designed to allow the dynamic element to sufficiently move within the container towards the top closure such that it causes the launch of the drone, while retaining the dynamic element within the volume of the container.

Yet another aspect of the present disclosure provides a drone-launching container. The drone-launching container defines a container axis and extends between a top opening sealed by a closure and a bottom end. The container comprises a drone and a drone-launching mechanism. The drone-launching mechanism is disposed between the bottom end and the drone and includes a dynamic element, which upon activation of the launching mechanism moves axially in the direction of the top closure. The drone is disposed between the launching mechanism and the top closure of the container and is in physical contact with the dynamic element at one end and the top closure at the second end. Upon activation of the launching mechanism, the movement of the dynamic element results in a corresponding movement of the drone leading to the removal of the closure and the launching through the top opening.

In some embodiments of the drone-launching container, the top closure is attached to the opening, namely attached to the walls of the container defining the opening, by glue or by tightly fitting therein.

In some embodiments of the drone-launching container, the drone is housed in the container in a non-deployed state, namely in a state where the arms holding the rotors are generally aligned with the body of the drone and therefore aligned along the container axis.

In some embodiments of the drone-launching container, the drone-launching mechanism is any one of the above-described embodiments.

Yet another aspect of the present disclosure provides a method for launching a drone housed in a container. The drone sits on a dynamic element, that is also housed in the container. The container includes a top opening sealed with a top closure. The method comprising generating an abrupt pressure that causes a propelling force resulting in a movement of the dynamic element towards the top opening. The dynamic element pushes the drone and causing its launch via the top opening while opening the top closure.

In some embodiments of the method, said generating is carried out in a confined space defined, at least partially, by the dynamic element.

EMBODIMENTS

The following are optional embodiments and combinations thereof in accordance with aspects of the present disclosure:

1. A drone-launching mechanism for launching a drone, contained in an elongated launching container defining a container axis extending between a container bottom and a container top through which the drone is launched, comprising:

two launching elements each having a cup portion defining a cup axis coaxial with the container axis, one cup portion fitting into the other and the two portions jointly defining a propelling space; one of the two elements being a static element fitted at a bottom portion of the container and the other of the two elements being a dynamic element, axially displaceable towards said top such that when it so displaces it causes corresponding displacement of the drone;

a pressure generator configured for generating an abrupt pressure within the propelling space, whereupon said dynamic element axially displaces towards said top thereby displacing the drone and leading to its launch.

2. The drone-launching mechanism of embodiment 1, wherein the cup portions are cylindrical and concentric.

3. The drone-launching mechanism of embodiment 1 or 2, wherein the static element is fixed to the container.

4. The drone-launching mechanism of any one of embodiments 1-3, wherein the dynamic element is attached to the static element in a releasable manner such that upon exceeding a certain pressure the two are detached.

5. The drone-launching mechanism of any one of embodiments 1-4, wherein the cup portions of the static and dynamic elements have respective static base with cup-defining walls projecting therefrom and a dynamic base with cup-defining walls projecting therefrom.

6. The drone-launching mechanism of embodiment 5, wherein the dynamic base is attached to the top end of the cup-defining walls of the static element.

7. The drone-launching mechanism of embodiment 5 or 6, wherein the dynamic element base is formed with pressure-releasing through holes.

8. The drone-launching mechanism of any one of embodiments 5-7, wherein the upper end of the cup-defining walls of the static element rest on the dynamic base.

9. The drone-launching mechanism of any one of embodiments 5-8, wherein the bottom end of the cup-defining walls of the dynamic element rest on the static base.

10. The drone-launching mechanism of any one of embodiments 1-9, wherein the static element cup portion fits within the dynamic element cup portion.

11. The drone-launching mechanism of any one of embodiments 1-9, wherein the dynamic element cup portion fits within the static element cup portion.

12. The drone-launching mechanism of any one of embodiments 1-11, wherein the pressure generator is housed within the propelling space.

13. The drone-launching mechanism of any one of embodiments 1-12, wherein the pressure generator is fixed to the dynamic element.

14. The drone-launching mechanism of any one of claims 1-12, wherein the pressure generator is fixed to the static element.

15. The drone-launching mechanism of any one of embodiments 1-14, wherein the pressure generator is a chemical reaction-based pressure generator.

16. The drone-launching mechanism of any one of embodiments 1-14, wherein the pressure generator comprises a detonator that upon detonation thereof causes said abrupt high pressure within the propelling space.

17. The drone-launching mechanism of embodiment 16, wherein said detonator comprises two or more chemical reactants that upon reacting with one another causing to said detonation.

18. The drone-launching mechanism of any one of embodiments 1-17, comprising a limiting thread attaching the dynamic element to the static element and limiting the movement of the dynamic element, after the activation of the launching mechanism, to a certain extent.

19. A drone-launching container defining a container axis and extending between a top opening sealed by a closure and a bottom end, comprising:
  a drone;
  a drone-launching mechanism disposed between the bottom end and the drone and comprises a dynamic element, which upon activation of the launching mechanism moves axially in the direction of the top closure;
  the drone is disposed between the launching mechanism and the top closure of the container and is in physical contact with the dynamic element at one end and the top closure at the second end;
  wherein upon activation of the launching mechanism, the movement of the dynamic element results in a corresponding movement of the drone leading to the removal of the closure and the launching through the top opening.

20. The drone-launching container of embodiment 19, wherein the top closure is attached to the opening by glue or by tightly fitting therein.

21. The drone-launching container of embodiment 19 or 20, wherein the drone is housed in the container in a non-deployed state.

22. The drone-launching container of any one of embodiments 19-21, wherein the drone-launching mechanism is any one of embodiments 1-18.

23. A method for launching a drone that sits on a dynamic element and is housed in a container having a top opening sealed with a top closure, the method comprising:
  generating an abrupt pressure that causes a propelling force resulting in a movement of the dynamic element towards the top opening, the dynamic element pushes the drone and causing its launch via the top opening while opening the top closure.

24. The method of embodiment 23, wherein said generating is carried out in a confined space defined, at least partially, by the dynamic element.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 1A-1H are illustrations of a non-limiting example of an embodiment of the drone-launching mechanism or parts thereof according to an aspect of the present disclosure. FIGS. 1A-1F show the launching mechanism prior to its activation and FIGS. 1G-1H show the launching mechanism after its activation.

FIGS. 2A-2F are illustrations of a non-limiting example of an embodiment of the drone-launching mechanism or parts thereof according to an aspect of the present disclosure. FIGS. 2A-2E show the launching mechanism prior to its activation and FIG. 2F shows the launching mechanism after its activation.

DETAILED DESCRIPTION

The following figures are provided to exemplify embodiments and realization of the invention of the present disclosure.

Reference is first being made to FIGS. 1A-1F, which are illustrations of a non-limiting example of different views of an embodiment of the drone-launching mechanism, or parts thereof, of the present disclosure, prior to its activation that causes the launching of the drone. The drone-launching mechanism 100 is housed within a container 101 containing a drone 103 to be launched (can be seen in FIG. 1B, which is a cross sectional view of the launching container that includes the launching mechanism and the drone resting against it) and includes a static element 102 and a dynamic element 104. The static element 102 is fixed to the container, in particular to the container's bottom 105, and includes a static cup portion 106 and the dynamic element includes a dynamic cup portion 108, as can be best seen in FIGS. 1D-1E. The dynamic cup portion 108 fits within the static cup portion 106, thus enclosing a propelling space/volume 110. The static cup portion 106 is formed by static cup-defining walls 112 upwardly extending from a static base 114 of the static element 102, the end of the static cup-defining walls 112 defines a static cup portion opening 113. The dynamic cup portion 108 is formed by dynamic cup-defining walls 116 upwardly extending from a dynamic base 118 of the dynamic element 104, the end of the dynamic cup-defining walls 116 defines a static cup portion opening 115. Thus, when a cup portion of one of the elements fits in the other its walls are practically received through the opening of the other element. The cup portions define a common cup axis CA, which is coaxial with a container axis (not shown) that is defined between two ends of the container, and the cup-defining walls extend parallel to the cup axis CA. The static and the dynamic bases 114 and 118 are typically planar and in this example have a generally circular shape wherein the walls extending therefrom are formed at an inner perimeter of the bases. The dynamic base 118 includes a cut section 119 in the circle defining it. The cut section 119 exposes a portion of the static cup-defining walls 112, in the thickness of this exposed walls portion a cable element 121 is axially extending and passing also through the cut section 119. The cable element 121, among other optional functionalities, prevents from the dynamic element 104 to rotate about the central axis CA with respect to the static element 102. The propelling space 110 is defined between the dynamic cup-defining walls 116, the static base 114, the dynamic base 118 and the static cup-defining walls 112 that practically envelope the dynamic cup-defining walls 116. The static cup-defining walls 116 are forming the outer walls of the drone-launching mechanism 100, and the dynamic cup-defining walls 116 are forming the inner walls of the drone-launching mechanism 100.

A pressure generator 120 is housed within the propelling space 110 and is configured for, upon its activation, for rapidly increasing the pressure within the propelling space 110 that results in the separation of the dynamic element 104 from the static element 102 and its movement along the cup axis CA in the upward direction UD. The drone (not shown) rest, directly or indirectly, on the dynamic base 118 and the movement of the dynamic element 104 in result to the increase of the abrupt increase of pressure within the propelling space 110 causes a corresponding movement of the drone along the cup axis CA that results in its launch via a container top opening 122 that is sealed with a closure 123. During the launch, the force that is generated by the launching mechanism results in that the drone 103 is pushed strongly enough to break the closure 123 and eject from the container 101. The drone 101, while housed in the container 103, is in a constant, tight, physical contact with the dynamic base 118 from a first side and with the top closure 123 from its second side, separated axially from the first side. Thus, any movement of the dynamic base 118 in response to the activation of the pressure generator, causing a corresponding movement of the drone 101 that leads to its launch through the opening 122 of the container 103. In this non-limiting example, the pressure generator 120 is fixed to the dynamic element 104 such that it is confined by the peripheral dynamic cup-defining walls 116.

Figure 1A:
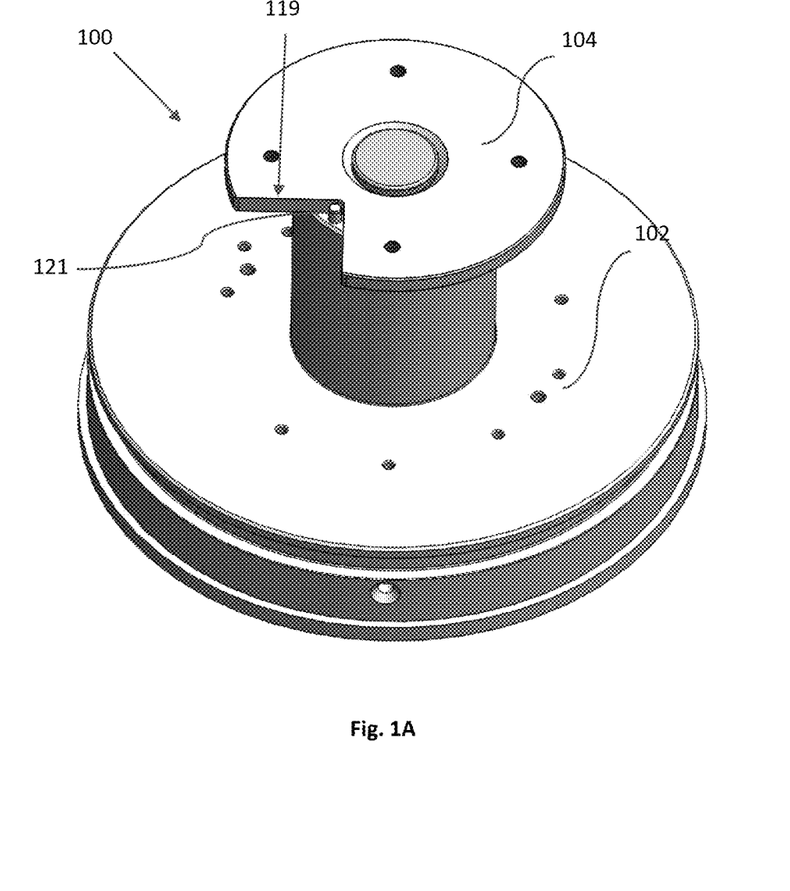
FIG. 1A is a perspective view.
Figure 1B:
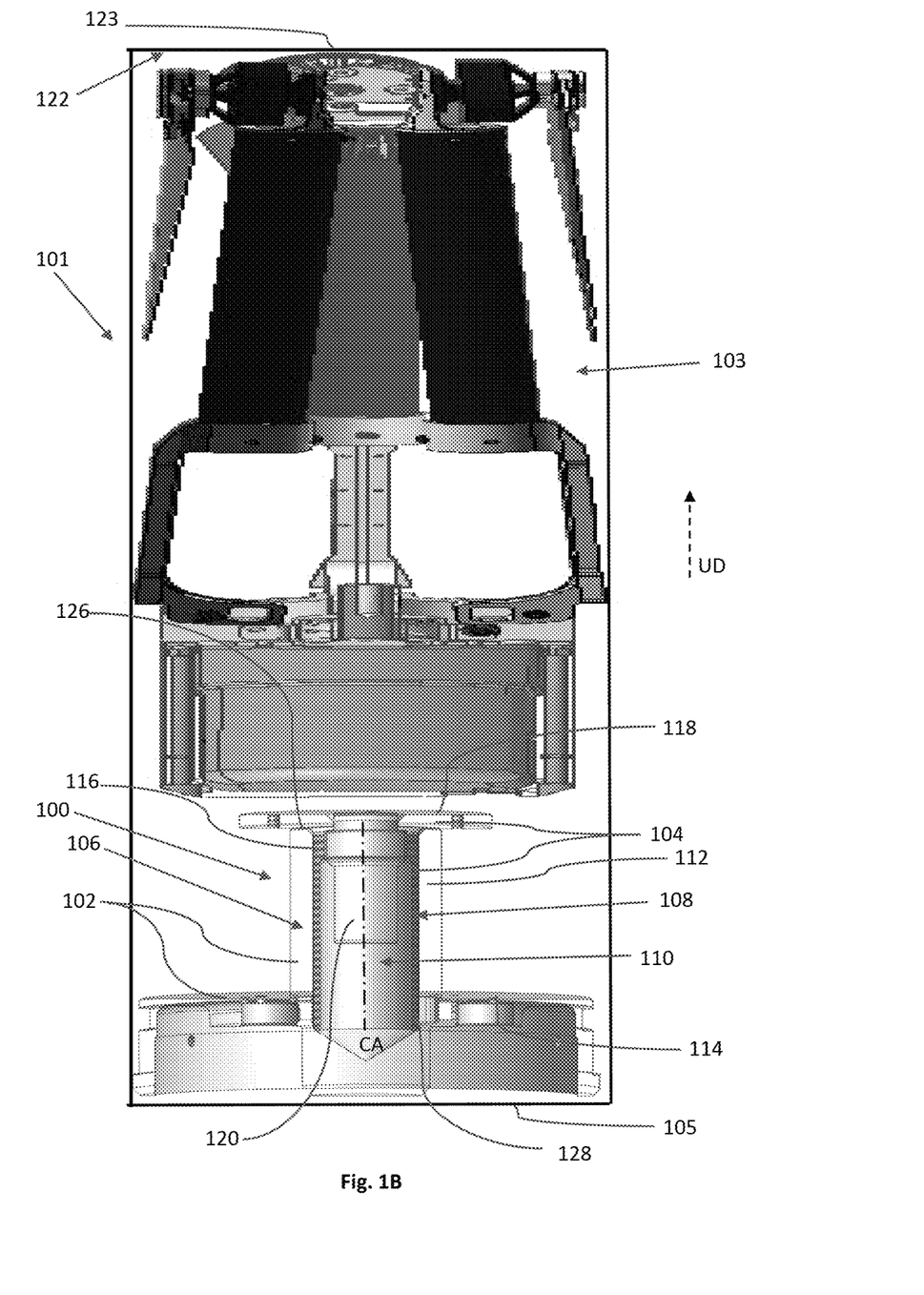
FIG. 1B is a cross-sectional view of the launching container that includes the launching mechanism and the drone to be launched.
Figure 1C:
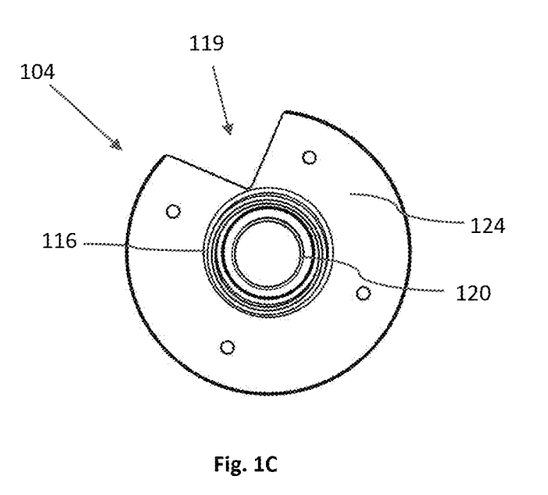
FIG. 1C is a bottom view of the dynamic element of the launching mechanism.
Figure 1D:
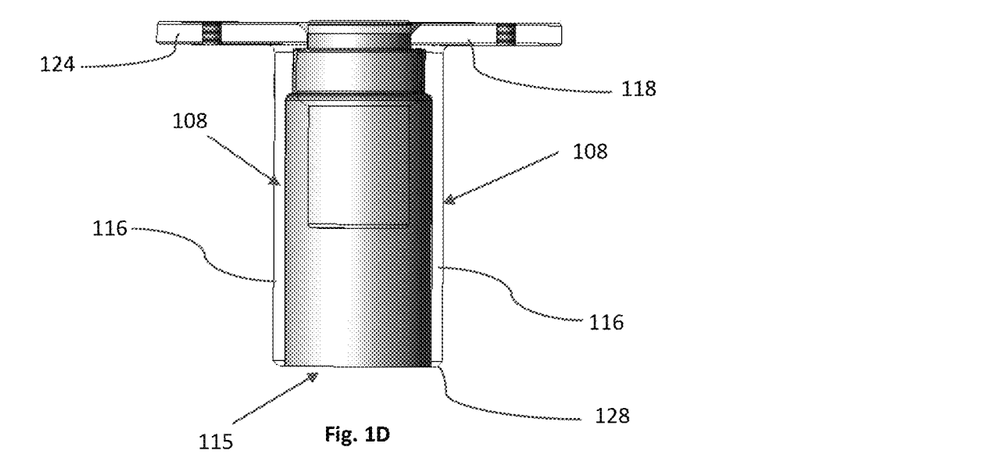
FIG. 1D is a cross-sectional view of the dynamic element.
Figure 1E:
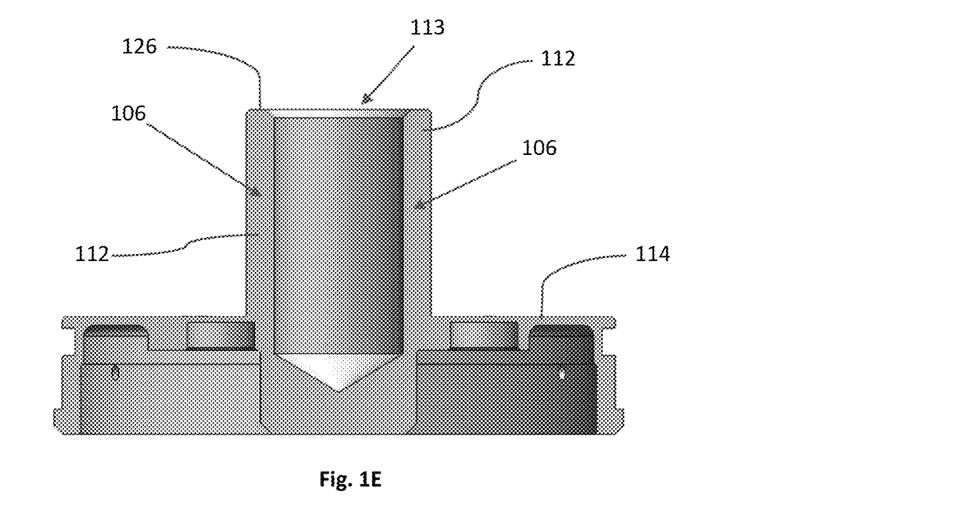
FIG. 1E is a cross-sectional view of the static element.
Figure 1F:
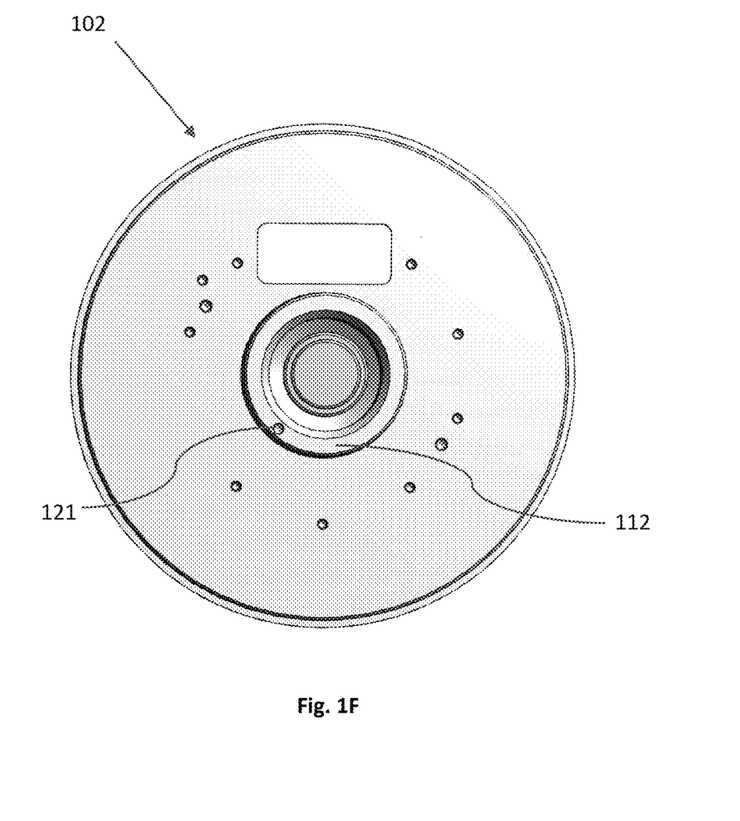
FIG. 1F is a top view of the static element.

Reference is now being made to FIG. 1C, which is a bottom view of the dynamic element 104. It can be appreciated that the pressure generator 120 is the most central part of the dynamic element 104, surrounded by the dynamic cup-defining walls 116 and both, the pressure generator 120 and the dynamic cup-defining walls 116 extend from the dynamic base 118. The dynamic base is wider than the portion defined by the dynamic cup-defining walls 116 and includes peripheral base section 124 that is peripheral to the portion from which the dynamic cup-defining walls 116 extend from, thereby forming a sufficiently wide base to support corresponding surface of the drone that rests on it.

Reference is now being made to FIG. 1B, in which it can be appreciated that the dynamic base 118 rests on the top end 126 of the static cup-defining walls 112.

The static and the dynamic elements 102 and 104 fit one into the other and they are held in their position by the pressure applied by the drone sitting on the dynamic element. Upon generation of sufficient force in result to the increase of the pressure within the propelling space 110, the dynamic element 104 is detached from the static element 102 and initiates to move along the cup axis CA and push the drone towards its launching via the container top 122.

Figure 1G:
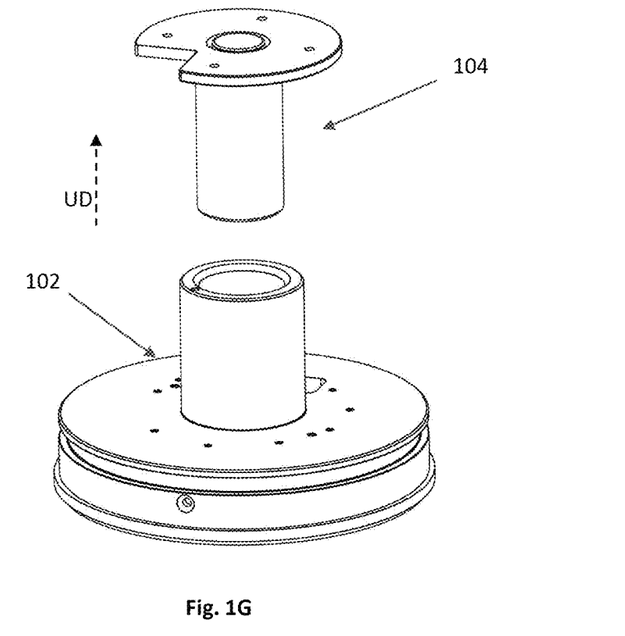
FIG. 1G is a perspective view.
Figure 1H:
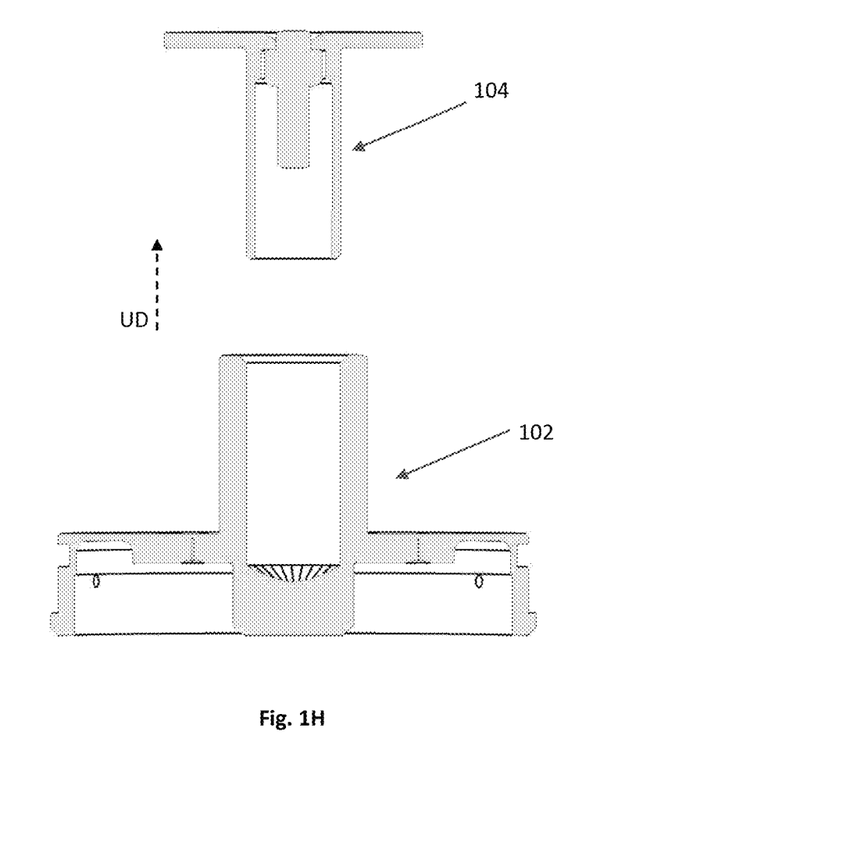
FIG. 1H is a cross-sectional view.

Reference is now being made to FIGS. 1G-1H, which are different views of the launching mechanism after its activation, where the dynamic element 104 is detached from the static element 102 and moves generally in the upward direction UD while correspondingly pushing the drone (not shown) and causing its launching via the container top.

In the figures throughout the application, like elements of different figures were given similar reference numerals shifted by the number of hundreds corresponding to the number of the respective figure. For example, element 202 in FIGS. 2A-2F serves the same function as element 102 in FIGS. 1A-1H.

Reference is now being made to FIGS. 2A-2E, which are illustrations of a non-limiting example of different views of an embodiment of the drone-launching mechanism, or parts thereof, of the present disclosure, prior to its activation that causes the launching of the drone. The drone-launching mechanism 200 is housed within a launching container (not shown) and includes static and dynamic elements 202 and 204, each having a respective cup portion 206 and 208. The static element 202 is fixed to the launching container and the dynamic element 204 is detachably attached to the static element. The dynamic cup portion 208 fits within the static cup portion 206, thus enclosing a propelling space/volume 210. The static cup portion 206 is formed by static cup-defining walls 212 upwardly extending from a static base 214 of the static element 202, the end of the static cup-defining walls 212 defines a static cup portion opening 213. The dynamic cup portion 208 is formed by dynamic cup-defining walls 216 upwardly extending from a dynamic base 218 of the dynamic element 204, the end of the dynamic cup-defining walls 216 defines a static cup portion opening 215. The dynamic base 218 includes shoulders 224 that are peripheral to the dynamic cup-defining walls 216 and the shoulders 224 rest on the top end 226 of the static cup-defining walls 212.

In this embodiment, the pressure generator 220 that is housed within the propelling space 210 is fixed to the static base 214 of the static element 202. Furthermore, in this embodiment, the dynamic base 218 includes pressure-releasing through-holes 230 linking between the propelling space 210 and the internal space of the container and are intended for releasing excess pressure from the propelling space during the launching process to obtain a controllable launching process.

The cup portions define a common cup axis CA, which is coaxial with a container axis (not shown) that is defined between two ends of the container, and the cup-defining walls extend parallel to the cup axis CA. The static and the dynamic bases 214 and 218 are typically planar and in this example have a generally circular shape wherein the walls extending therefrom are formed at an inner perimeter of the bases.

Figure 2A:
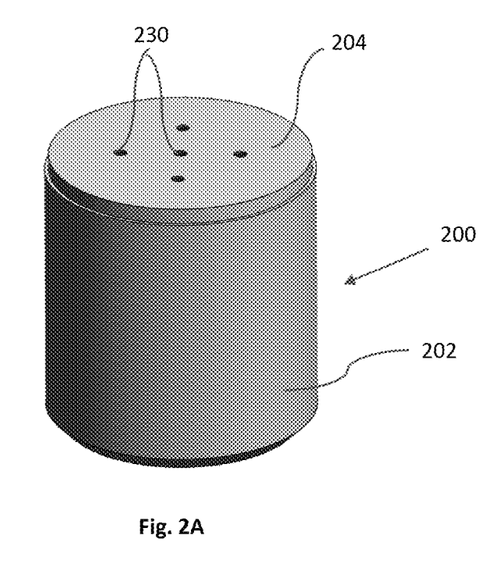
FIG. 2A is a perspective view.
Figure 2B:
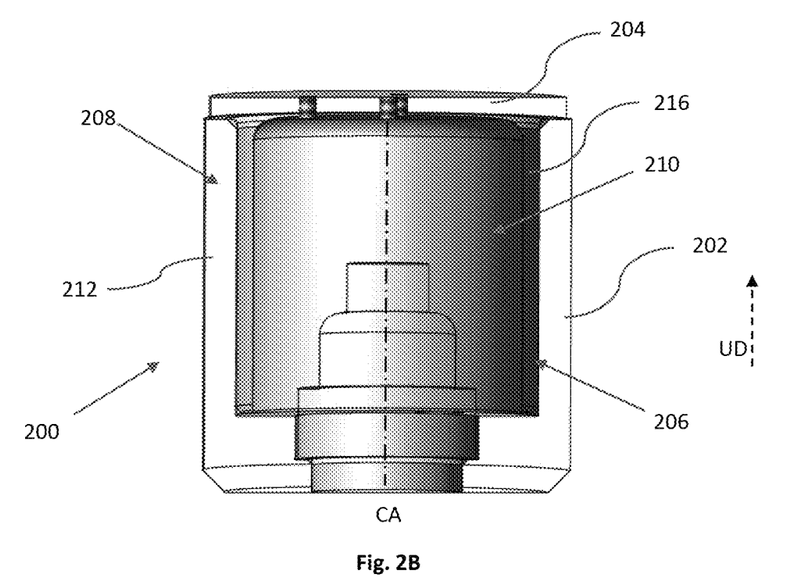
FIG. 2B is a cross-sectional view.
Figure 2C:
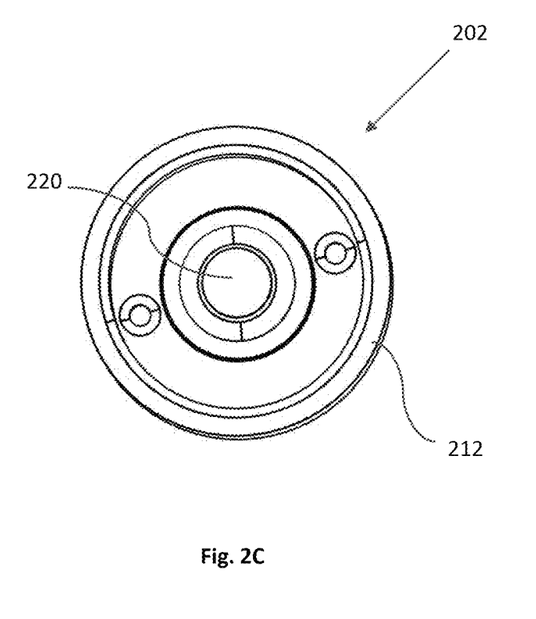
FIG. 2C is a top view of the static element of the launching mechanism.
Figure 2D:
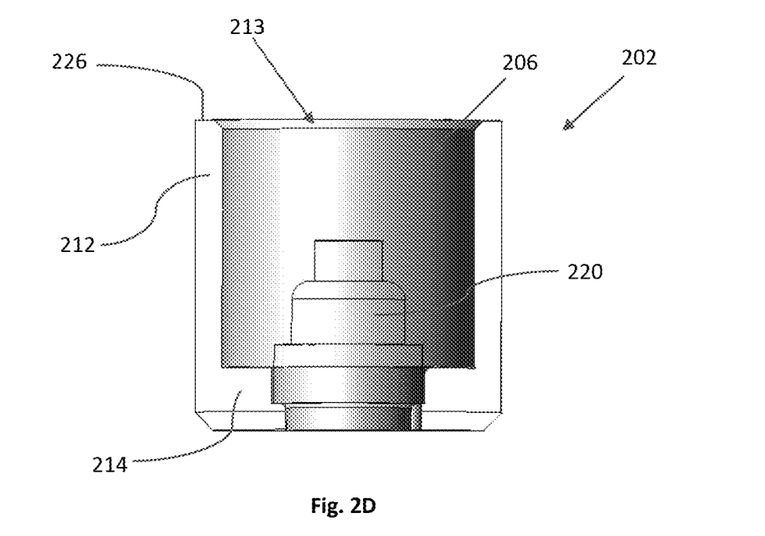
FIG. 2D is a cross-sectional view of the static element.
Figure 2E:
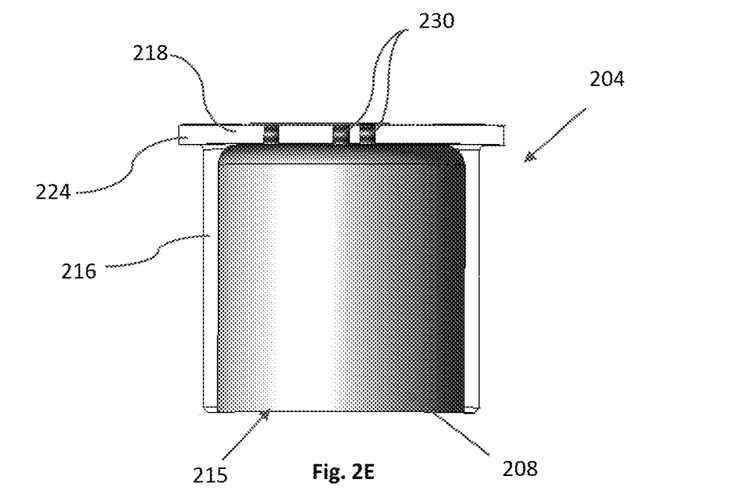
FIG. 2E is a cross-sectional view of the dynamic element.

Reference is specifically made to FIG. 2C, which is a top view of the static element 202. It can be appreciated that the pressure generator 220 is located within the perimeter of the static cup-defining walls 212. Namely, the pressure generator is fixed to the base of the static element and is confined by its cup-defining walls.

Figure 2F:
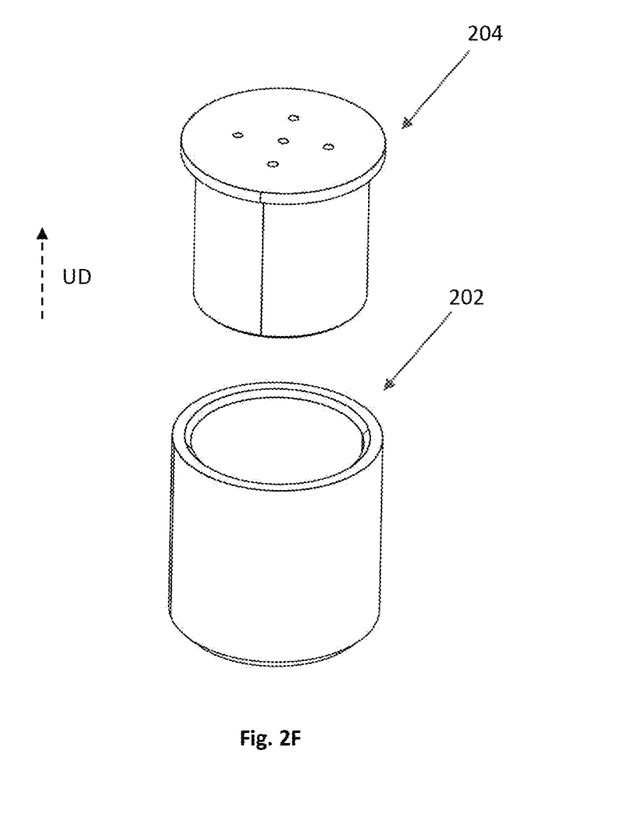
FIG. 2F is a perspective view.

FIG. 2F show the launching mechanism after its activation, where the dynamic element 204 is detached from the static element 202 and moves generally in the upward direction UD while correspondingly pushing the drone (not shown) and causing its launching via the container top.

The invention claimed is:

1. A drone-launching mechanism for launching a drone, contained in an elongated launching container defining a container axis extending between a container bottom and a container top through which the drone is launched, comprising:
   two launching elements each having a cup portion defining a cup axis coaxial with the container axis, one cup portion fitting into the other and the two portions jointly defining a propelling space; one of the two elements being a static element fitted at a bottom portion of the container and the other of the two elements being a dynamic element, axially displaceable towards said top such that when it so displaces it causes corresponding displacement of the drone;
   a pressure generator configured for generating an abrupt pressure within the propelling space, whereupon said dynamic element axially displaces towards said top thereby displacing the drone and leading to its launch
   wherein the cup portions of the static and dynamic elements each have a respective static base with cup-defining walls projecting therefrom and a dynamic base with cup-defining walls projecting therefrom;
   wherein the dynamic base is attached to the top end of the cup-defining walls of the static element.

2. The drone-launching mechanism of claim 1, wherein the static element is fixed to the container.

3. The drone-launching mechanism of claim 1, wherein the dynamic element is attached to the static element in a releasable manner such that upon exceeding a certain pressure the two are detached.

4. The drone-launching mechanism of claim 1, wherein the dynamic element base is formed with pressure-releasing through holes.

5. The drone-launching mechanism of claim 1, wherein the upper end of the cup-defining walls of the static element rests on the dynamic base.

6. The drone-launching mechanism of claim 1, wherein the bottom end of the cup-defining walls of the dynamic element rests on the static base.

7. The drone-launching mechanism of claim 1, wherein the static element cup portion fits within the dynamic element cup portion.

8. The drone-launching mechanism of claim 1, wherein the dynamic element cup portion fits within the static element cup portion.

9. The drone-launching mechanism of claim 1, wherein the pressure generator is housed within the propelling space; and
   wherein the pressure generator is fixed to the dynamic element or to the static element.

10. The drone-launching mechanism of claim 1, wherein the pressure generator is a chemical reaction-based pressure generator.

11. The drone-launching mechanism of claim 1, wherein the pressure generator comprises a detonator that upon detonation thereof causes said abrupt high pressure within the propelling space.

12. The drone-launching mechanism of claim 11, wherein said detonator comprises two or more chemical reactants that upon reacting with one another cause said detonation.

13. The drone-launching mechanism of claim 1, comprising a limiting thread attaching the dynamic element to the static element and limiting the movement of the dynamic element, after the activation of the launching mechanism, to a certain extent.

14. A drone-launching mechanism for launching a drone, contained in an elongated launching container defining a container axis extending between a container bottom and a container top through which the drone is launched, comprising:
   two launching elements each having a cup portion defining a cup axis coaxial with the container axis, one cup portion fitting into the other and the two portions jointly defining a propelling space; one of the two elements being a static element fitted at a bottom portion of the container and the other of the two elements being a dynamic element, axially displaceable towards said top such that when it so displaces it causes corresponding displacement of the drone;
   a pressure generator configured for generating an abrupt pressure within the propelling space, whereupon said dynamic element axially displaces towards said top thereby displacing the drone and leading to its launch;
   wherein the dynamic element cup portion fits within the static element cup portion.

15. A drone-launching mechanism for launching a drone, contained in an elongated launching container defining a container axis extending between a container bottom and a container top through which the drone is launched, comprising:
   two launching elements each having a cup portion defining a cup axis coaxial with the container axis, one cup portion fitting into the other and the two portions jointly defining a propelling space; one of the two elements being a static element fitted at a bottom portion of the container and the other of the two elements being a dynamic element, axially displaceable towards said top such that when it so displaces it causes corresponding displacement of the drone;
   a pressure generator configured for generating an abrupt pressure within the propelling space, whereupon said dynamic element axially displaces towards said top thereby displacing the drone and leading to its launch;

wherein the pressure generator is housed within the propelling space; and wherein the pressure generator is fixed to the dynamic element or to the static element.

* * * * *